March 2, 1954     J. W. ALLISON ET AL     2,670,670
MOLDBOARD SOIL PULVERIZER
Filed Nov. 25, 1949
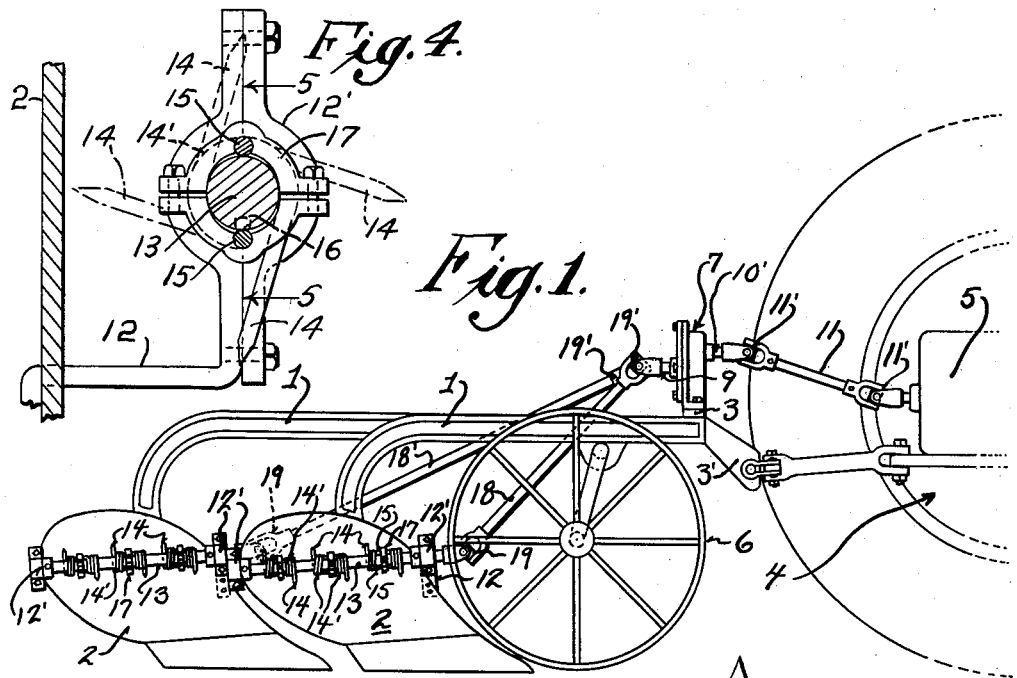
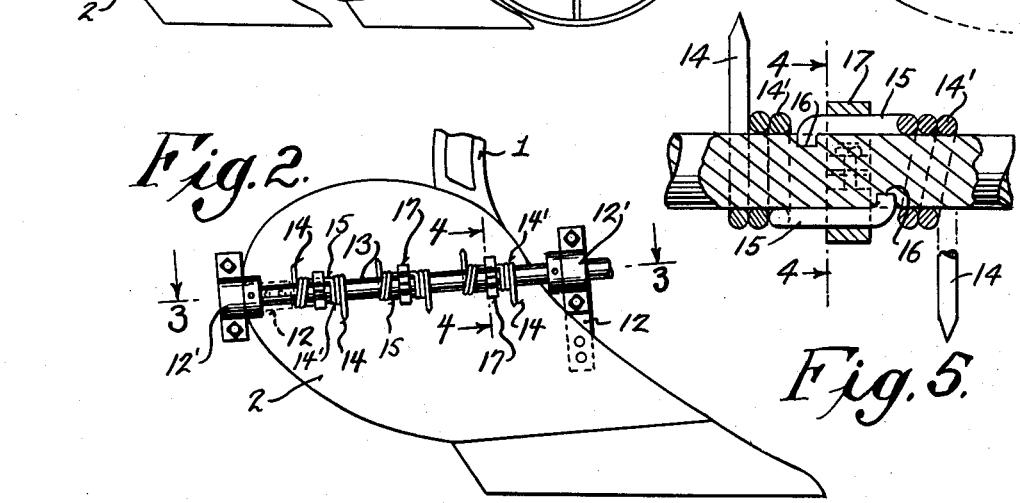
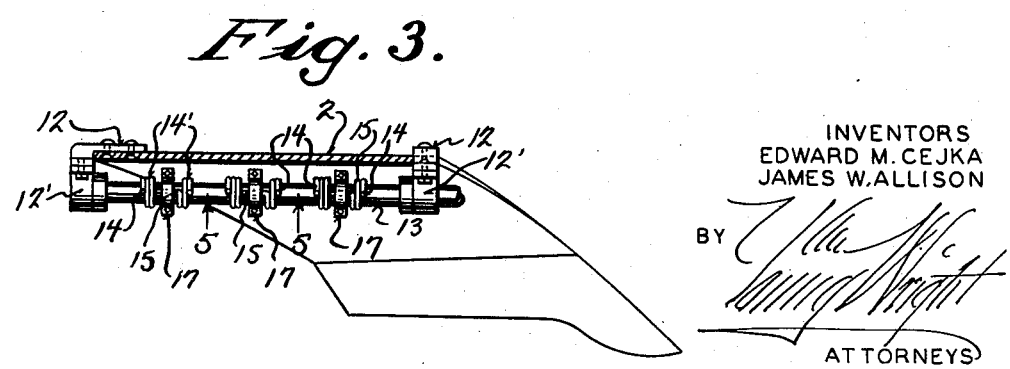
INVENTORS
EDWARD M. CEJKA
JAMES W. ALLISON
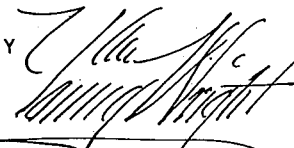
ATTORNEYS Patented Mar. 2, 1954

2,670,670

UNITED STATES PATENT OFFICE 2,670,670

MOLDBOARD SOIL PULVERIZER

James W. Allison, Mondovi, and Edward M. Cejka, Milwaukee, Wis.

Application November 25, 1949, Serial No. 129,424

1 Claim. (Cl. 97—216)

Our invention refers to mold board soil pulverizers for plows.

The object of our invention is to provide tractor driven plows, each having an attachment to the mold board, comprising a rotary driven shaft, carrying a soil pulverizer engageable with the front face of said mold board.

The tractor connected plows have secured thereto a gear box encasing a transmission gear wheel meshed with a pair of gear wheels. The pair of gear wheels have stud shafts, which stud shafts and the pulverizer shafts are in universal joint connection with angular disposed coupling shafs for transmitting power to the pulverizer shafts from the stud shaft of the transmission gear wheels. Each stud shaft of said transmission gear wheel is driven from the tractor power "take off" by a tumbler shaft in universal joint connection with the power "take off" and stud shaft of the transmission gear wheel. It is understood also that the gang of plows are hitched to a standard tractor provided with the usual plow adjusting levers, not shown, whereby said plows are raised and lowered.

It is also understood that the pulverizer may be attached to a single plow under certain conditions.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 represents a side elevation of a tractor driven pair of plows having attached thereto soil pulverizers, embodying the features of our invention.

Figure 2 is an enlarged face view of a single mold board having a pulverizer shaft attached thereto in accordance with our invention.

Figure 3 is a plan sectional view of the same, the section being indicated by line 3, 3 of Figure 2.

Figure 4 is a cross sectional elevation of the pulverizer and mold board fragment, the section being indicated by line 4, 4 of Figure 5.

Figure 5 is a sectional elevation of one of the soil pulverizer spring tongue units, the section being indicated by line 5, 5 of Figure 4.

Referring by characters to the drawings, 1, 1 indicates plow beams carrying mold boards 2, 2, the plow beams being connected by a reach bar 3 and a tongue 3' extending from the reach bar is in link connection with a tractor 4, the same being provided with the usual power "take off" 5 as indicated in Figure 1 of the drawing. The plows carrying the usual furrow and land wheels 6 of standard type.

Secured to the reach bar 3 is a casing 7 carrying a pair of gear wheels 8, 8 mounted upon stud shafts 9, which stud shafts are journaled in the casing 7. The casing 7 also carries a power transmission gear wheel 10 which meshes with a pair of gear wheels 8 and is provided with a stud shaft 10', which stud shaft is connected to the tractor power "take off" by a tumbler shaft 11 that is coupled to the power "take off" and stud shafts by means of universal joints 11'.

Secured to the rear wall of each mold board 2 are brackets 12 terminating with journal boxes 12' for the reception of a pulverizer shaft 13.

Each pulverizer shaft carries a series of pairs of spring tongues 14 having coiled shanks 14' surrounding the shaft 13, which coil shanks terminate with longitudinally disposed prongs 15 that are inclined towards each other and rest upon the surface of the shaft. The ends of the prongs are downturned to engage sockets 16 formed in the shaft, whereby the tongues are held against rotation. When the pairs of prongs are so fitted to the shaft 13, they are confined by split clamps 17, which clamps engage the pair of prongs, as best indicated in Figures 4 and 5 of the drawings, it being understood that the shaft 13, when rotated, will cause the series of tongues to rapidly rotate against the front face of the mold board, whereby clods of soil flowing up from the ground will be thoroughly broken up.

Each pulverizer shaft 13 is connected by angular rods 18, 18' to the gear wheel stud shafts 9, 9 by means of universal joints 19, 19' to the pulverizer shafts and stud shafts 9, whereby said pulverizer shafts and stud shafts will transmit rotary motion to the tongues while permitting rise and fall of the plows beams, hence, it will be noted that when the tongues engage a hard clod of soil they will slightly yield owing to their coil spring shanks.

Changes in details may be made without departing from the spirit or the scope of this invention, but what we claim as new is:

A spring tine assembly for a soil pulverizer attachment to a mold board of a plow of the type having a horizontally disposed driven shaft rotatably mounted upon a face of the mold board and a series of soil pulverizer spring tongues secured to the shaft and arranged in pairs comprising, a pair of spaced coiled shanks surrounding said shaft, the adjacent ends of the shanks each having a laterally extending prong, said prongs lying in overlapping relation to one another on opposite sides of the shaft, each of said laterally extending prongs having inturned ends engaging the shaft, a clamp carried by said shaft and extending around said laterally extending prongs, whereby the coiled shanks and the prongs are resiliently secured to the shaft, and a pair of spring tongues, each secured to the opposite end of a respective shank, said tongues extending radially from said shaft in opposite directions and lying on opposite sides thereof.

JAMES W. ALLISON.
EDWARD M. CEJKA.

References Cited in the file of this patent

UNITED STATES PATENTS

| Number | Name | Date |
|---|---|---|
| 314,609 | Schenck | Mar. 31, 1885 |
| 1,173,822 | Lyons | Feb. 29, 1916 |
| 1,800,252 | Grams | Apr. 14, 1931 |
| 1,950,834 | Wyss | Mar. 13, 1934 |
| 2,242,479 | Panengen | May 20, 1941 |